United States Patent [19]

Offer et al.

[11] 4,028,243

[45] June 7, 1977

[54] RELIEF VALVE FOR A FLUID FILTER ASSEMBLY

[75] Inventors: Robert J. Offer, Racine, Wis.; Bernard J. Van Vooren, Albert Lea, Minn.

[73] Assignee: Tenneco Inc., Racine, Wis.

[22] Filed: May 28, 1976

[21] Appl. No.: 690,835

[52] U.S. Cl. .......................... 210/130; 137/516.23; 210/136; 210/DIG. 17
[51] Int. Cl.² ........................................ B01D 27/10
[58] Field of Search ................ 137/516.15, 516.17, 137/516.19, 516.21, 516.23; 210/130, 136, DIG. 17

[56] References Cited

UNITED STATES PATENTS

| | | | |
|---|---|---|---|
| 2,995,249 | 8/1961 | Boewe et al. ................... | 210/136 X |
| 3,061,101 | 10/1962 | Humbert, Jr. ...................... | 210/130 |
| 3,156,259 | 11/1964 | Havalka et al. ................ | 210/130 X |
| 3,589,517 | 6/1971 | Palmai ................................ | 210/130 |
| 3,633,750 | 1/1972 | Braun et al. ........................ | 210/130 |

*Primary Examiner*—Thomas G. Wyse
*Assistant Examiner*—Robert H. Spitzer
*Attorney, Agent, or Firm*—James R. Hagen

[57] ABSTRACT

Flexible assembly facilitating members attached to the valve body of a relief valve for a fluid treatment assembly, such as a fluid filter assembly, serve to maintain the valve components as a unit prior to assembly of the valve into the fluid filter assembly. During final assembly of the filter assembly the assembly facilitating members are biased into an inoperative position whereby operation of the valve is not dependent upon the assembly facilitating members.

3 Claims, 10 Drawing Figures

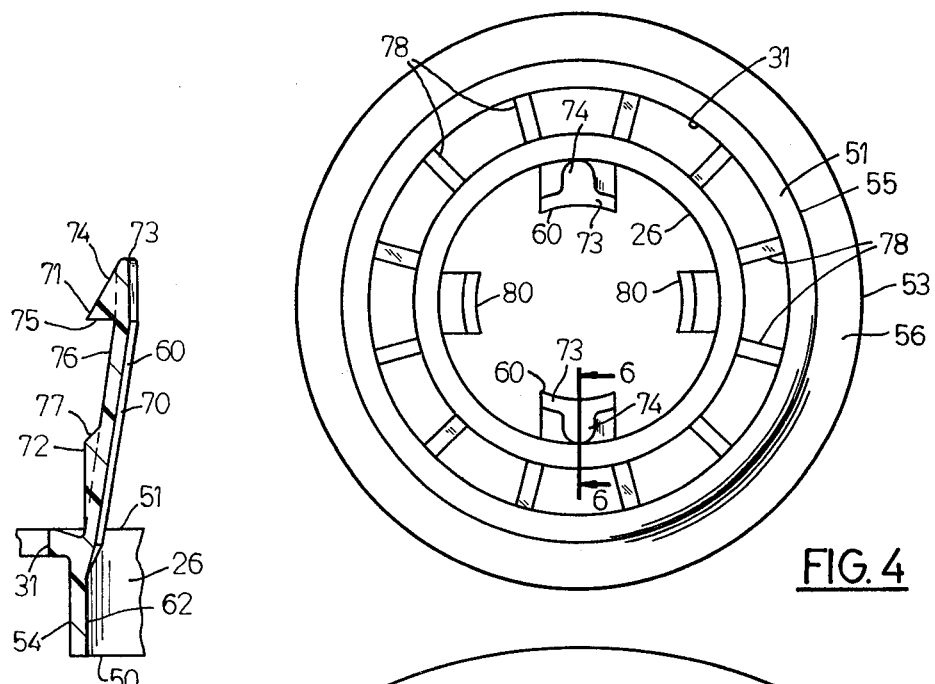
FIG. 6
FIG. 4
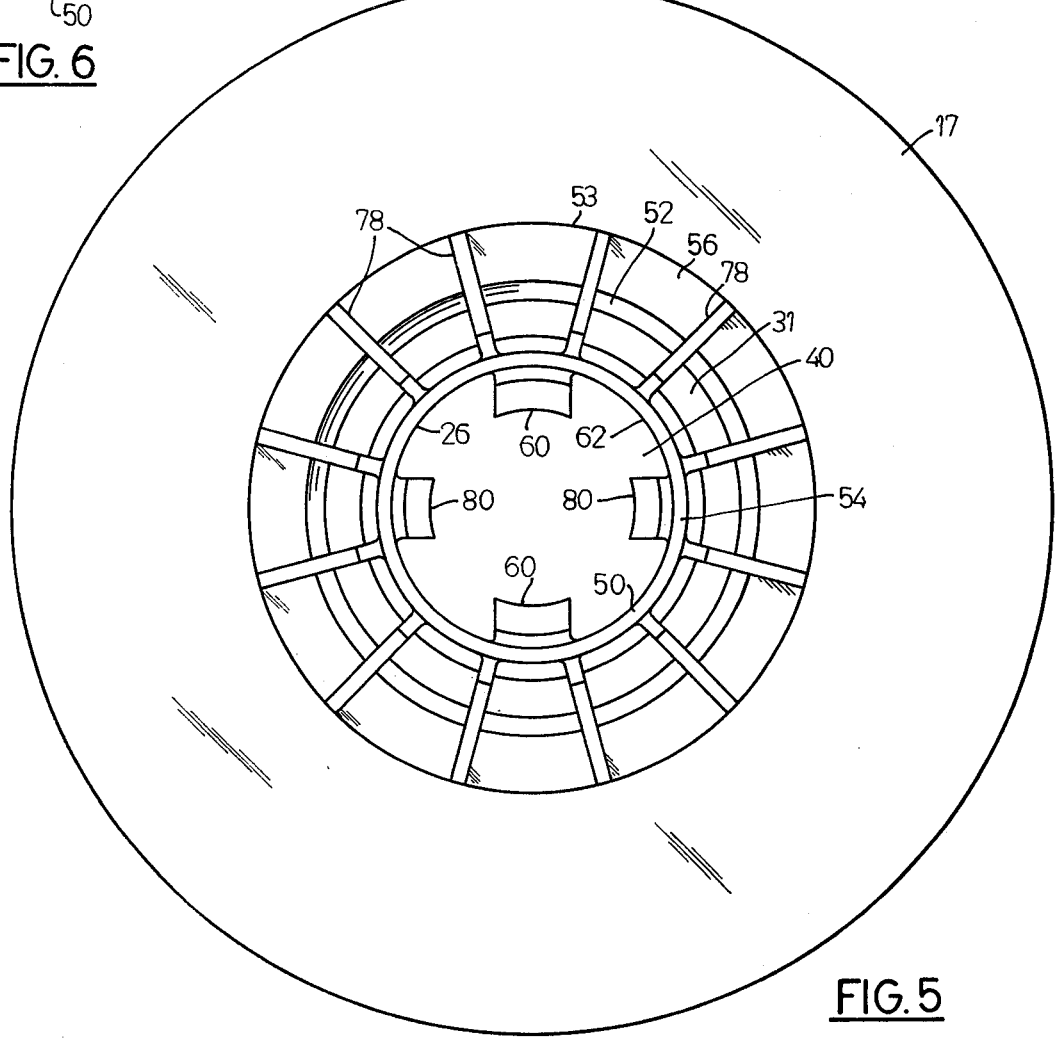
FIG. 5

4,028,243

RELIEF VALVE FOR A FLUID FILTER ASSEMBLY

BACKGROUND OF THE INVENTION

This invention relates to relief or by-pass valves for disposable spin-on type fluid filter assemblies, such as lubricant and working fluid filter assemblies for vehicular and industrial applications. Such relief valves, in response to a predetermined fluid pressure, generally resulting from pump surges on start-up or from filter medium plug up, open to allow fluid to by-pass the filter medium and thus assure an adequate supply or fluid downstream of the filter assembly and/or prevent rupture of the filter medium.

Generally, these relief valves are comprised of a biasing means, such as a helical coil spring which maintains a seal member in sealing engagement at a predetermined resilient loading with a plurality of fluid flow openings. Examples of such relief valves for fluid filter assemblies are shown in U.S. Pat. Nos. 3,061,101 and 3,156,259.

The helical spring in the valves shown in these patents is confined between the seal means and an integral portion of the valve body, i.e. the member containing the flow openings, to maintain the seal means in sealing engagement with the flow openings under normal conditions.

The valve body shown in U.S. Pat. No. 3,061,101 is formed of metal and the valve body shown in U.S. Pat. No. 3,156,259 is formed of a moldable plastic having a high temperature melting point relative to many other plastics. Use of a moldable plastic for the valve body is highly desirable as it permits rapid and economic forming of the relatively complex configuration generally required for such valve bodies. Also, use of moldable plastic enables economic formation of integrally molded flexible members which extend from the valve body to retain the springs. Small cross section flexible members are preferable as they facilitate construction, minimize any impediment to fluid flow and provide a material savings. However, under some circumstances, such as when a relief valve is exposed to high temperature fluid flow, plastic members having a relatively small cross section may lose strength and elongate, or even break, due to the constant force of the spring they are confining. Such elongation or breakage would not be readily detectable and would cause a large amount or in the case of breakage, virtually all, of the fluid to by-pass the filter element.

Additionally, to achieve manufacturing efficiency, it is desirable to form and maintain the separate components of a relief valve as a unitized subassembly to facilitate assembly of the valve into a complete filter assembly.

SUMMARY OF THE INVENTION

A molded valve body for by-pass or relief valves for fluid filter assemblies has integral flexible members which facilitate assembly of the components to form the valve and serve to maintain the valve components as a unit or subassembly upon assembly of the valve. Having the valve components maintained as a unit or subassembly renders the components readily transportable between processing stations or manufacturing facilities and facilitates their assembly into a filter assembly. During assembly of the valve into a filter assembly the flexible members are biased into an inoperative position whereby proper operation of the relief valve is not dependent upon continued structural integrity of the assembly facilitating members.

BRIEF DESCRIPTION OF THE DRAWINGS

FIG. 4 is a top view of the valve body of the valve shown in FIG. 2;

FIG. 5 is a bottom view of the valve body shown in FIG. 4 and engaged with a filter element end cap;

FIG. 6 is a section view of a flexible assembly facilitating member sectioned as indicated in FIG. 4;

DETAILED DESCRIPTION OF THE INVENTION

Figure 1:
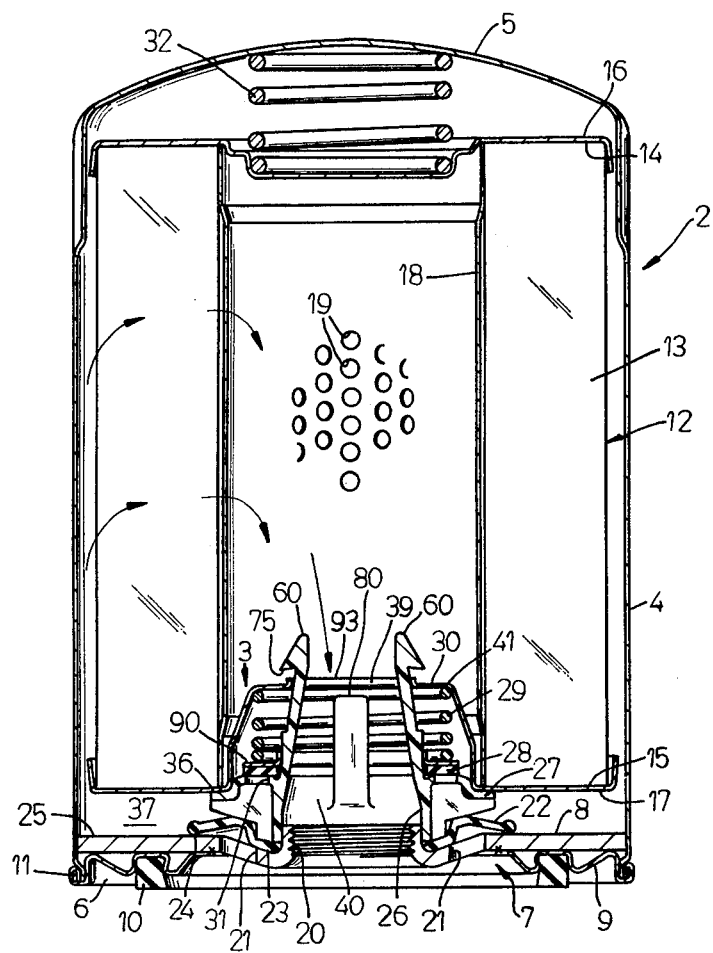
FIG. 1 is a full section view of a fluid filter assembly containing a preferred embodiment of the relief valve of this invention.

FIG. 1 shows a fluid treatment assembly, in this case a typical spin-on type fluid filter assembly 2, containing a by-pass or relief valve assembly 3 of this invention. Filter assembly 2 is comprised of a substantially cylindrical metal shell 4 having a closed end 5 and an open end 6. End 6 is closed by suitable closure means such as unit end cap assembly 7 which is formed of an attachment plate 8, gasket retention plate 9 and resilient gasket 10. Attachment plate 8 and retention plate 9 are secured together by suitable means such as spot welding, as indicated by convention on the drawing. The unit end cap assembly 7 is sealingly engaged with end 6 of shell 4 by suitable means, such as lock seam 11. A fluid treatment element, such as filter element 12 is contained within shell 4. Element 12 is comprised of an annulus of a filter medium 13, such as pleated paper, which is sealingly engaged at each of its ends 14 and 15 by an element end cap 16 and 17 respectively. A center tube 18, having perforations 19 is disposed in the center of the annulus of filter medium 13 and extends between end caps 16 and 17. Center tube 18 supports the filter medium 13 from radially inward collapse when fluid flows radially inward through medium 13 and additionally strengthens the filter element in the axial or longitudinal direction.

Attachment plate 8 has a threaded central opening 20 adapted to threadedly engage an externally threaded attachment post (not shown) on a suitable mounting base (not shown). The typical attachment post, well-known to those skilled in the art of spin-on filter design, manufacture and use, has an axial fluid flow opening in communication with suitable flow means in the mounting base to enable fluid to flow out of the filter through the base to oil galleys or other suitable receptacles or points of use in devices such as internal combustion engines, hydraulic systems for industrial machinery, etc.

A plurality of inlet ports or openings 21 surround opening 20. Fluid enters the filter assembly through these ports. An anti-drainback valve 22 formed of an annulus of resilient material is placed coaxial with opening 20, overlays inlet ports 21, and sealingly engages at least two concentric continuous annular portions 23 and 24 of surface 25 on attachment plate 8. A filter element stand-off 26 surrounds central opening 20 and maintains the resilient material of valve 22 in sealing engagement with continuous annular portion 23 of surface 25. Due to the resilience of valve 22 it is forced upward by the urging of forced fluid flow through ports 21 to enable fluid to flow between the resilient material and portion 24 of suface 25 when fluid is forced, as by a pump, through the filter. When forced fluid flow ceases the inherent resiliency of valve 22 causes it to again sealingly engage portion 24 of surface 25 to prevent fluid from flowing out of the filter assembly through inlet ports 21.

Element by-pass or relief valve 3 is comprised of a valve body 27, or which element stand-off 26 is an integral part, a seal means, such as annular resilient seal member 28, a load or force distributing member, such as annular back up plate 90, biasing means, such as helical coil spring 29, and a valve housing formed of a biasing means retention means, such as the inverted cup shaped spring retainer 30, sealingly engaged with end cap 17. In FIG. 1 spring retainer 30 is formed as an integral part of element end cap 17.

A plurality of fluid flow openings 31 are present in valve body 27. Seal member 28 is disposed to maintain openings 31 sealed to prevent fluid flow through them under normal conditions. Helical spring 29 maintains seal member 28 sealed against the openings 31 with a predetermined resilient force or loading.

A continuous annular portion 36 of valve body 27 is sealingly engaged with end cap 17 to prevent fluid flow between the valve body and the end cap. Conventional element hold down spring 32 positioned between end 5 of shell 4 and end cap 16 of element 12 biases the filter element toward unit end cap 7 to maintain a continuous annular portion of resilient material 22 in sealing engagement with a continuous annular portion of surface 25 surrounding opening 20 of attachment plate 8. Additionally, the hold down spring 32 biases the continuous annular portion 36 of valve body 27 into sealing engagement with a portion of end cap 17 and portion 36 prevents further axial movement of end cap 17 toward attachment plate 8 to form annular flow chamber 37.

In normal operation fluid flows through inlet openings 21, between surface 25 of attachment plate 8 and anti-drainback valve 22 into chamber 37, through media 13 and perforated tube 18 as indicated by the flow arrows and exits the filter assembly by flowing serially through a central flow opening 39 in spring retainer 30, a central flow opening 40 in valve body 27 and the central flow opening normally present in the attachment post (not shown) which would be threadedly engaged with central opening 20 in attachment plate 8 in normal operation of the filter assembly 2.

Figures 2, 3:
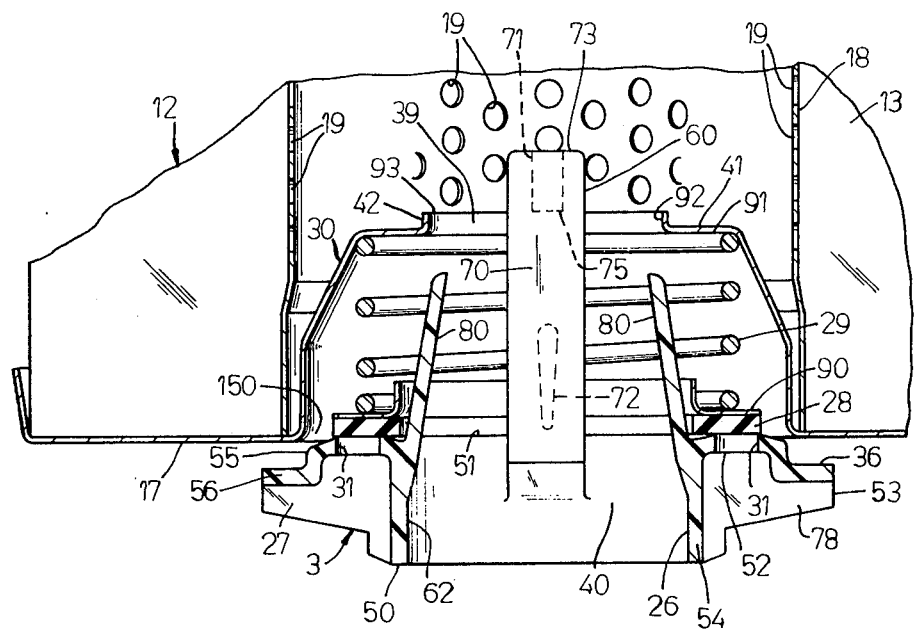
FIG. 2 is a full section view of the valve of FIG. 1 prior to its installation into the filter assembly.
FIG. 3 is a full section view of the valve shown in FIG. 2 rotated 90°.

FIG. 2 shows the by-pass or relief valve 3 shown in FIG. 1 prior to its assembly into a fluid filter assembly. In FIG. 2 the valve is shown engaged with the filter element 12, shown in a partial section view only, having the annulus of pleated paper 13, the perforated center tube 18 and the end cap 17. The spring retainer 30 has an inverted cup shape and is formed integral with end cap 17. A central flow opening 39 is formed in the top 41 of retainer 30 to enable fluid flow through the retainer and an upstanding rim or flange 42 surrounds opening 39.

Valve body 27 is preferably formed of a moldable durable plastic, for example, nylon. Valve body 27 has a substantially cylindrical filter element stand-off 26 having a first or lower end 50 and a second or upper end 51. A flange 52 formed integral with the upper end 51 of stand-off 26 extends radially outwardly from the upper end and terminates with a substantially circular periphery 53 substantially concentric with the cylindrical wall 54 of stand-off 26, as best seen in FIGS. 4 or 5.

Flange 52 contains a plurality of fluid flow openings 31 arranged in a circular pattern concentric with wall 54 of stand-off 26. Radially outwardly from openings 31 an annular shoulder 55 is formed by an axial offset of a portion 56 of flange 52. Shoulder 55 fits within retainer 30 to assure accurate alignment between the valve body and the retainer. Surface 36 is adapted for sealing engagement with, or adjacent to, an open end 150 of the valve housing formed by sealing engagement of retainer 30 with a continuous annular portion of end cap 17.

A pair of assembly facilitating members 60 are formed integral with a portion of the interior wall of cylindrical stand-off 26 and extend axially upward from the upper end of the stand-off to pass through opening 39 in retainer 30.

FIG. 6 shows a sectional cutaway of an assembly facilitating member 60, as indicated by the section line of FIG. 4. The assembly facilitating member is formed integral with a portion of radially inwardly facing surface 62 of the wall 54 of cylindrical stand-off 26. Member 60 extends axially upwardly above or beyond the upper end 51 of wall 54 and is composed of an elongated flexible shank 70, a radially outwardly extending support projection 71 and a radially outwardly extending component guide projection 72. Projections 71 and 72 are radially outwardly extending relative to the longitudinal axis of the stand-off 26.

Support projection 71 is integral with the upper terminal end 73 of shank 70. End 73 is rounded and projection 71 has a surface 74 which tapers or inclines radially outwardly from end 73 and a support surface 75 which preferably forms an acute angle with the radially outwardly facing surface 76 of shank 70.

Component guide projection 72 also preferably has a radially outwardly sloping or inclined surface 77. In the preferred embodiment of the valve two assembly maintenance members 60, as shown in FIGS. 2, 4 and 5, are provided. The members are formed integral with all 54 of stand-off 26 and are located diametrically opposite each other.

A plurality of support ribs 78, as shown in FIGS. 3, 4 and 5, are molded integral with valve body 3 to assure structural integrity of the body.

As shown in FIGS. 2 and 3 a pair of pilot members 80 are molded integral with wall 54 at surface 62 and extend longitudinally upward from the first or upper end of stand-off 26. The members 80 are located diametrically opposite each other and each is located at substantially a 90° angle from an assembly maintenance member 60 on radially inwardly facing cylindrical surface 62, as best seen in FIGS. 4 and 5.

Pilot members 80 and component guide projections 72 serve to maintain the annular components of the valve in their proper relationship to assure sealing of flow ports 31.

Referring to FIG. 3, assembly of the relief valve is accomplished by placement of the annular seal member 27, seal member back-up plate 90 and spring 29 over resilient members 60 and guide members 80. Retainer 30 is then placed coaxial with the upper end 91 of spring 29 and the valve body 27 and retainer 30 are forced axially toward each other, either manually or by mechanical means, causing the inclined surface 74, shown in FIGS. 2 and 6, of each assembly maintenance member 60 to engage a portion of the radially inwardly facing surface 92 of opening 39 of retainer 30. Due to the flexibility of the shank 70 of each member 60, end 73 of each member 60 is forced radially inwardly causing support projection 71 to pass through opening 39. As soon as each inclined surface 74 on support projection 71 clears the top surface 93 of opening 39 they move radially outwardly due to the memory of flexible shank 70 causing support surface 75 to be positioned for engagement with a portion of top surface 93 of opening 39. When the axial force compressing retainer 30 and valve body 27 toward each other is removed the axial force of the now compressed and confined spring 29 urges retainer 30 away from valve body 27 and causes each support surface 75 on the members 60 to engage a portion of surface 93 as best seen in FIG. 2. As projections 71 are prevented from passing through opening 39 due to this engagement the valve components, i.e., the spring retainer, spring, back-up plate, seal member and valve body are maintained as a unit or sub-assembly which may be conveniently stored, shipped to another facility and/or readily installed into a fluid filter assembly. End cap 17 may be sealingly engaged with the filter medium 13 before or after assembly of valve 3.

Referring to FIG. 1, upon assembly into the filter assembly 2 the hold-down spring 32, being stronger than spring 29, forces surface 36 of valve body 27 into sealing engagement with a continuous annular portion of end cap 17 and forces each support surface 75 out of engagement with surface 93 of opening 39 as shown in FIG. 1. In this position the spring is confined between the retainer 30 and back-up plate 90 and operation of valve 3 is not dependent upon the tensile strength of members 60.

Figure 7:
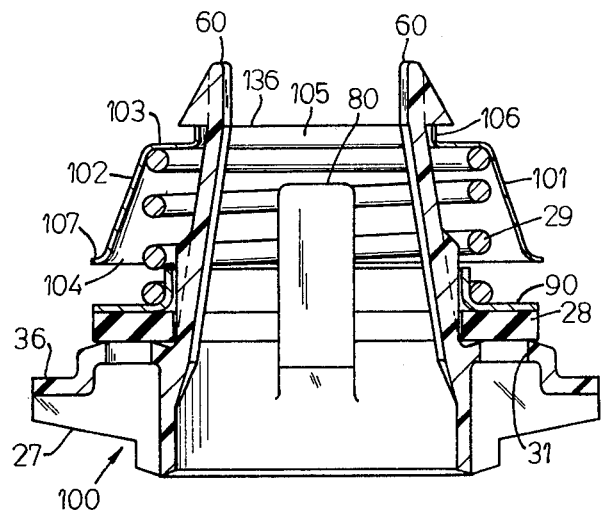
FIG. 7 is a full section view of an alternate embodiment of the valve of this invention prior to its assembly into a filter assembly.

FIG. 7 is a full section view of an alternate embodiment of the valve of this invention.

This valve assembly 100 has a modified spring retainer 101 which is adapted for use in a filter assembly construction in which it is not convenient to have the spring retainer formed integral with an element end cap to form the valve housing.

Other than spring retainer 101 all components of valve assembly 100 are identical to valve assembly components of assembly 3 of FIGS. 2, 3, 4 and 6 and they function in the same way.

Retainer 101 has a frusto-conically shaped side wall 102 having an upper closed end 103 and a lower open end 104. Closed end 103 contains a central opening 105 which is surrounded by an upstanding rim 106. Lower end 104 is defined by a radially outwardly extending flange 107 which is formed integral with wall 102.

In FIG. 7 the valve components are assembled and maintained as a unit in the same way as previously described for valve assembly 3.

Figure 8:
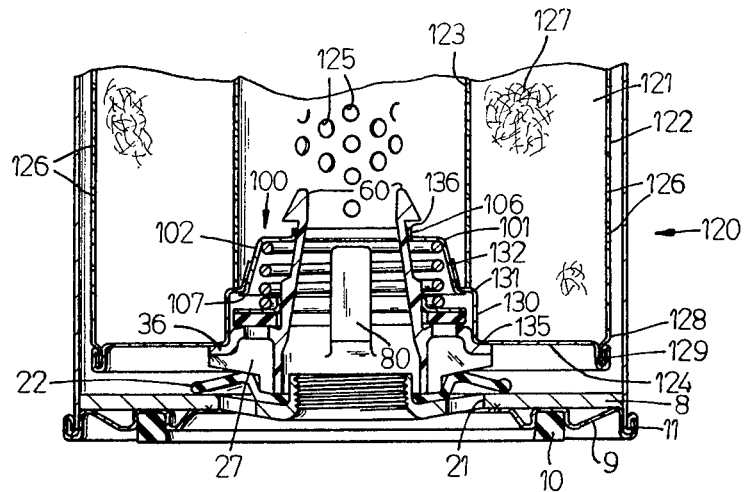
FIG. 8 is a full section view of a portion of a filter assembly containing the alternate embodiment of the valve shown in FIG. 7.

In FIG. 8 valve assembly 100 is shown assembled into filter assembly 120, of which only a portion is shown.

With the exception of filter element 121 and, of course, spring retainer 101 all components of filter assembly 120 are identical to the filter assembly shown in FIG. 1.

Filter element 121 is comprised of an element outer shell 122, a center tube 123 and element end cap 124.

Center tube 123 is a cylindrical, generally metal, tube having fluid flow openings or perforations 125. Element outer shell 122 is generally formed of metal and has flow openings or perforations 126. A filter medium 127, such as appropriate randomly oriented packed fibers, is placed between the element outer shell and center tube.

Element end cap 124 is sealingly engaged with an end 128 of shell 122, such as by lock seam 129, along the periphery of the end cap.

End cap 124 has a central opening defined by an integral longitudinally extending wall 130, a ledge or transverse center tube bench 131 and a frusto-conical portion 132.

Frusto-conical wall 102 is disposed to sealingly engage the radially inner surface of frusto-conical portion 132 of end cap 124 and radially extending flange 107 of retainer 101 sealingly engages the under side of a portion of center tube bench 131 to form a valve housing. Thus when valve assembly 100 is assembled into filter assembly 120 retainer 101 sealingly engages the central opening in end cap 124 and, upon installation of the unit end cap assembly, the hold down spring, which would be substantially as shown in FIG. 1, biases circumferential surface 36 of valve body 27 into sealing engagement with a portion 135 of end cap 124 and the assembly maintenance members 60 are forced out of engagement with the edge 136 of rim 106 and operation of the valve is not dependent upon the structural integrity of the assembly facilitating members 60.

Figure 9:
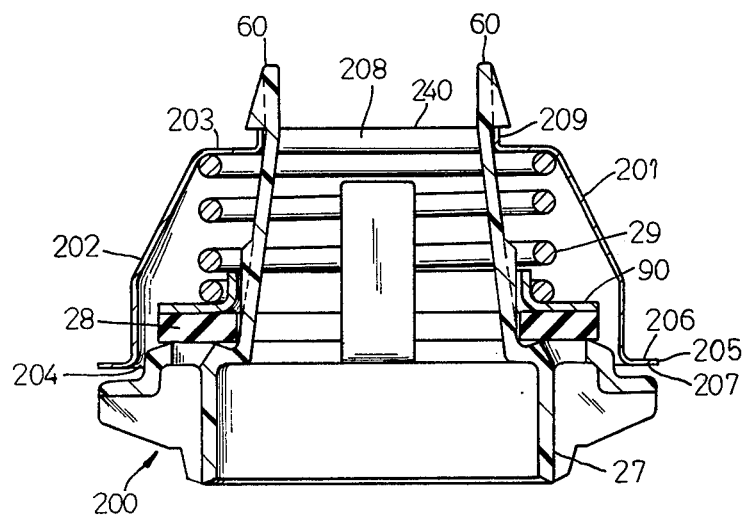
FIG. 9 is another alternate embodiment of the valve of this invention prior to its assembly into a filter assembly.

FIG. 9 shows another alternate embodiment of the valve of this invention. Valve assembly 200 has a modified spring retainer 201 which is not formed integral with an element end cap.

All components of this valve assembly, with the exception of spring retainer 201 are substantially similar to the components shown and previously described for valve assembly 3.

Spring retainer 201 has a wall 202 defining an inverted cup shape with an upper closed end 203 and a lower open end 204. At lower end 204 the retainer terminates in a radially extending flange 205 which has a top surface 206 and a bottom surface 207.

Upper or closed end 203 has a central opening 208 which is surrounded by an upstanding flange 209.

In the assembled position shown the assembly facilitating members 60 perform substantially the same function in substantially the same way as previously described for valve assembly 3.

Figure 10:
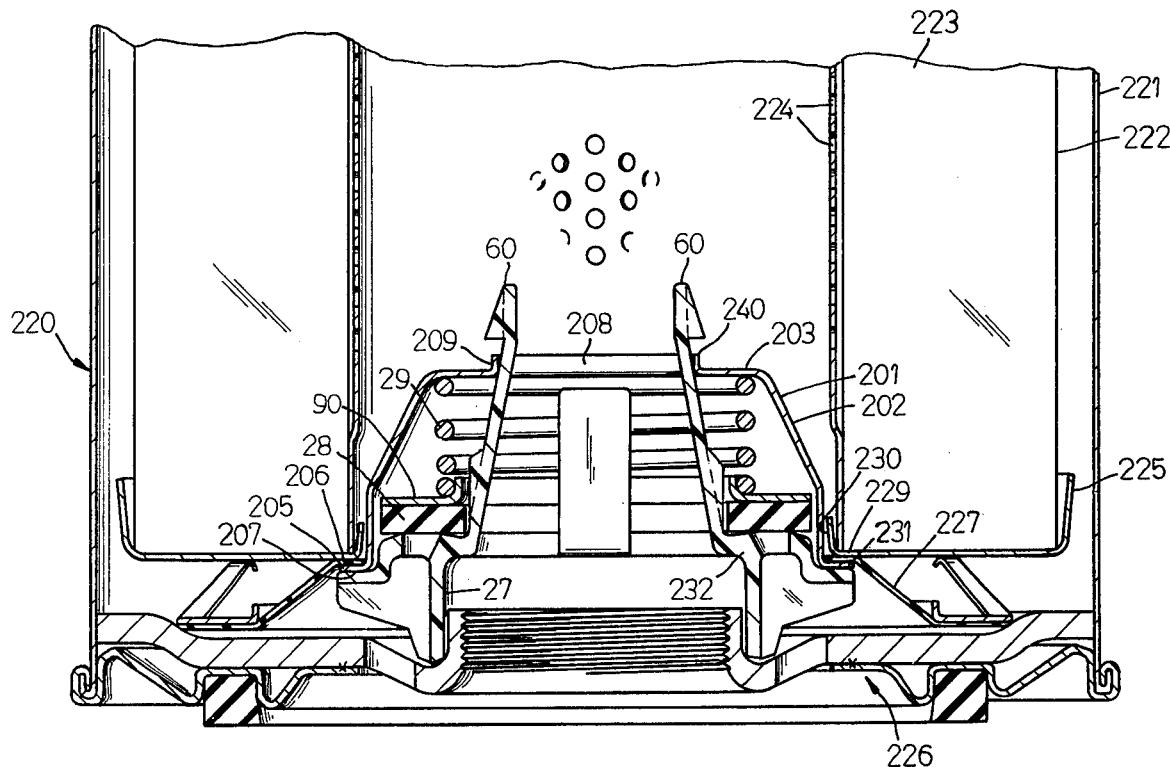
FIG. 10 is a full section view of a portion of a filter assembly containing the alternate embodiment of the valve shown in FIG. 9.

FIG. 10 shows the valve assembly 200 installed into a suitable filter assembly 220. Assembly 220 is comprised of a fluid filter medium, such as an annulus of pleated paper, 223, a perforated center tube 224, a filter element end cap 225 and a unit end cap assembly 226.

Filter element end cap 225 has a central opening 230 adapted to receive spring retainer 201.

An annular resilient anti-drainback valve member 227 has a central opening which seats around spring retained wall 202 adjacent flange 205 and has an annular portion interposed between surface 206 of flange 205 and an annular portion 229 of end cap 225.

The hold down spring (not shown) biases the filter element downward toward unit end cap assembly 226 causing sealing engagement between portion 229 of end cap 225, a continuous annular portion of member 227, and top surface 206 of flange 205 and between bottom surface 207 of flange 205 and an appropriate surface 231 of valve body 232.

As previously described for the other embodiments the hold down spring, not shown, but substantially as in FIG. 1, also biases assembly facilitating members 60 out of engagement with the top edge 240 of rim 209 and operation of the valve is not dependent upon the structural integrity of members 60.

Referring to FIG. 1, a typical by-pass mode of operation of the relief valve occurs when filter medium 13 of element 12 becomes restrictive to fluid flow, generally due to having pores in it blocked by contaminants such as particulate matter, to the point where the fluid pressure upstream of the filter medium, such as in flow chamber 37, imposes a greater upward force on seal member 28 through openings 31 than the downward force imposed on seal member 28 by spring 29. Consequently, the fluid pressure unseats member 28 and fluid flows through openings 31 into the valve housing, thus by-passing medium 13 to relieve the pressure on medium 13. The fluid exits the filter assembly in the conventional manner as previously described for normal flow. In each of the embodiments of the invention shown in FIGS. 1, 8 and 10 neither the normal nor the by-pass modes of operation of the valve are dependent on assembly facilitating members 60 as the spring which imposes the force on the seal member is confined between the seal member and the spring retention member of the valve housing.

What is claimed is:

1. In a fluid treatment assembly having an outer shell closed at one end, a fluid treatment element, having a first end cap and a second end cap, within said shell, a treatment element hold down spring interposed between said closed end of said shell and said first end cap and a unit end cap assembly sealingly engaged with said open end of said shell, said hold down spring biasing said treatment element toward said unit end cap assembly, an improved treatment element by-pass valve comprising:

a valve housing formed of a spring retention means sealingly engaged with said second end cap, said valve housing having a closed end and an opened end, said closed end having a fluid flow opening for enabling fluid to flow from said treatment element into said valve housing;

a valve body interposed between said open end of said valve housing and said unit end cap assembly and sealingly engaged with said open end of said valve housing, said valve body having a fluid flow opening for enabling fluid to flow from said valve housing and at least one pressure responsive fluid flow opening for enabling fluid to flow into said valve housing through said pressure responsive opening in response to a predetermined fluid pressure; and by-pass valve assembly facilitating means attached to said valve body and extending through said fluid flow opening in said closed end of said valve housing, for engaging a portion of said valve housing adjacent said opening in said closed end of said valve housing for maintaining said housing and said body as a unit prior to assembly of said valve into said fluid treatment assembly, said assembly facilitating means being substantially disengaged from said valve housing by the biasing force of said element hold down spring for preventing operation of said valve from being dependent upon said assembly facilitating means in said fluid treatment assembly.

2. The invention as defined in claim 1 in which said valve body is formed of a molded plastic and said assembly facilitating means is formed of a molded plastic molded integral with said valve body.

3. The invention as defined in claim 2 in which said assembly facilitating means is comprised of a pair of flexible elongated shanks, each of said shanks having a first end molded integral with a radially inwardly facing surface defining said opening for enabling fluid flow from said housing, each of said shanks extending axially from said valve body through said opening in said closed end of said valve housing and each of said shanks terminating in a second end beyond said opening and a radially outwardly extending projection adjacent said second end of each of said shanks, each of said projections being out of contact with said valve housing for preventing operation of said valve from being dependent upon said flexible shanks.

* * * * *